United States Patent [19]
Prillwitz

[11] Patent Number: 5,595,443
[45] Date of Patent: Jan. 21, 1997

[54] ABRASIVE RESISTANT BEARING

[76] Inventor: Kenneth G. Prillwitz, P.O. Box 3107, Visalia, Calif. 93278

[21] Appl. No.: 390,113

[22] Filed: Feb. 17, 1995

[51] Int. Cl.⁶ ........................................................ B01F 7/04
[52] U.S. Cl. ............................ 366/331; 366/241; 384/276; 384/296
[58] Field of Search ........................... 384/913, 276, 384/296; 451/326, 328; 366/331, 279, 241, 325.1, 325.92

[56] References Cited

U.S. PATENT DOCUMENTS

| | | | |
|---|---|---|---|
| 717,127 | 12/1902 | Sherman | 384/276 |
| 2,411,138 | 11/1946 | Roberts | 366/325.92 |
| 2,961,224 | 11/1960 | Wright | 366/331 |
| 3,199,795 | 8/1965 | Bennett et al. | 366/331 |
| 4,169,637 | 10/1979 | Voitas | 384/276 |
| 4,334,926 | 6/1982 | Futamura et al. | 384/913 |
| 4,759,644 | 7/1988 | Mizukusa et al. | 384/913 |
| 4,997,324 | 3/1991 | Shirai et al. | 384/913 |

Primary Examiner—Robert A. Rose

[57] ABSTRACT

An abrasion resistant bearing system for use in the agitation assembly of a mineral dissolution machine. The agitation assembly is part of the mixing tank where abrasive materials such as gypsum, nitrogen, potassium, sulphur and the like are kept in a mixed condition for ultimate discharge into an agricultural irrigation system.

5 Claims, 4 Drawing Sheets

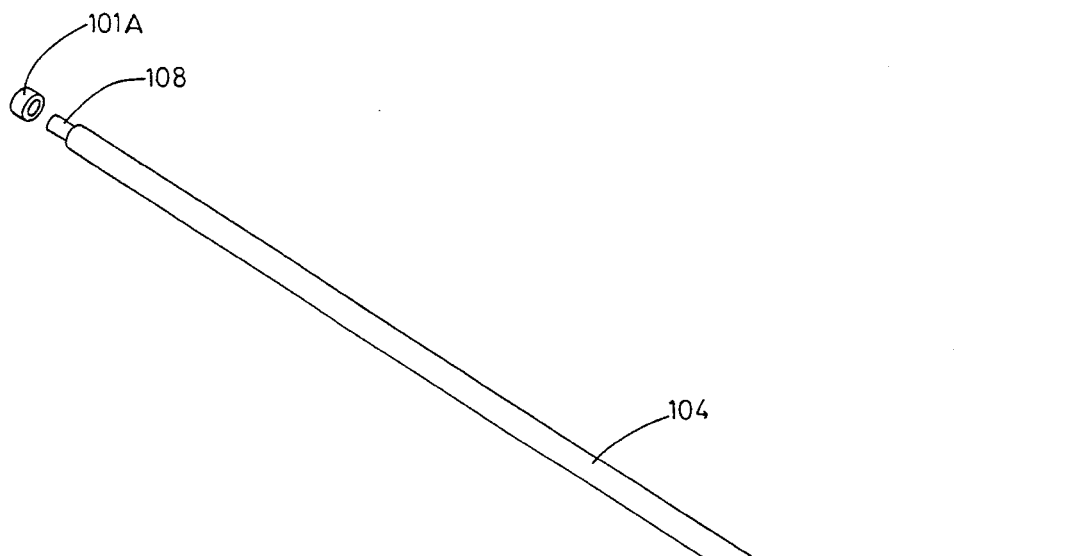
FIG. 5
FIG. 6
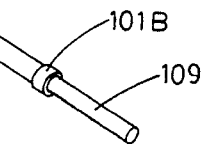

ABRASIVE RESISTANT BEARING

BACKGROUND OF THE INVENTION

The present invention relates to bearings, and in particular to an abrasion resistant bearing for use in mixing machines for abrasive minerals.

In agriculture, it is desirable to enhance soils with certain minerals and nutrients such as gypsum, sulphur, potassium and nitrogen. Many growers have installed drip or sprinkler irrigation systems for their crops. These irrigation systems provide an efficient method for applying such minerals and nutrients to the soil. There are a number of well known mixing machines in use which provide different ways of mixing these minerals and nutrients with water for injection into irrigation systems. Among these are U.S. Pat. Nos. 4,812,045; 4,820,053; and 5,417,491. The dissolution machines described in these patents include a large mixing tank with an agitation apparatus inside where the mineral or nutrient is mixed with water. Large amounts of these materials are mixed with water in order to keep the material in suspension.

Unfortunately, these materials are very abrasive. Moreover, minerals such as gypsum will settle out very rapidly when agitation is stopped making it very difficult to then bring them back into suspension. As a result, it is often necessary to keep such materials actively agitated for long periods of time. The abrasive quality of these materials causes much wear on the bearings of the agitation assembly.

Existing agitation systems have been constructed using parts made out of cast iron and brass. The abrasive quality of materials such as gypsum causes significant wear on parts made of these materials resulting in continuous maintenance in the form of repair and replacement.

In 1982, Spraying Devices, Inc. of Visalia, Calif. developed a material made of glass filled nylon for use in the bearings of agitation systems. While this proved a great improvement over the cast iron and brass, the glass filled nylon still wore out too quickly.

SUMMARY OF THE INVENTION

The present invention solves the abrasion problem by providing a unique bearing assembly utilizing tungsten carbide parts that can withstand the long term contact with these abrasive materials in the mixing tank of a dissolution machine.

It is therefore a primary object of the present invention to provide a bearing assembly for use in a mineral dissolution machine that can withstand the abrasive qualities of the minerals as they are mixed in the machine.

It is another important object of the present invention to provide a method for including tungsten carbide bearings as part of an agitation apparatus for a mineral dissolution machine.

It is a further important object of the present invention to provide a relatively wear free bearing assembly for use in machines designed for dissolution of abrasive agricultural materials such as nitrogen, potassium, sulphur, gypsum and the like.

It is a further important object of the present invention to provide a relatively maintenance free and lubrication free bearing assembly for use in machines designed for dissolution of abrasive agricultural materials.

BRIEF DESCRIPTION OF THE DRAWINGS

FIG. 5 is an exploded perspective view of the shaft and bearings of the present invention.

FIG. 6 is a perspective view of the shaft of the present invention showing the bearings in place thereon.

DETAILED DESCRIPTION OF THE DRAWINGS

Figure 1:
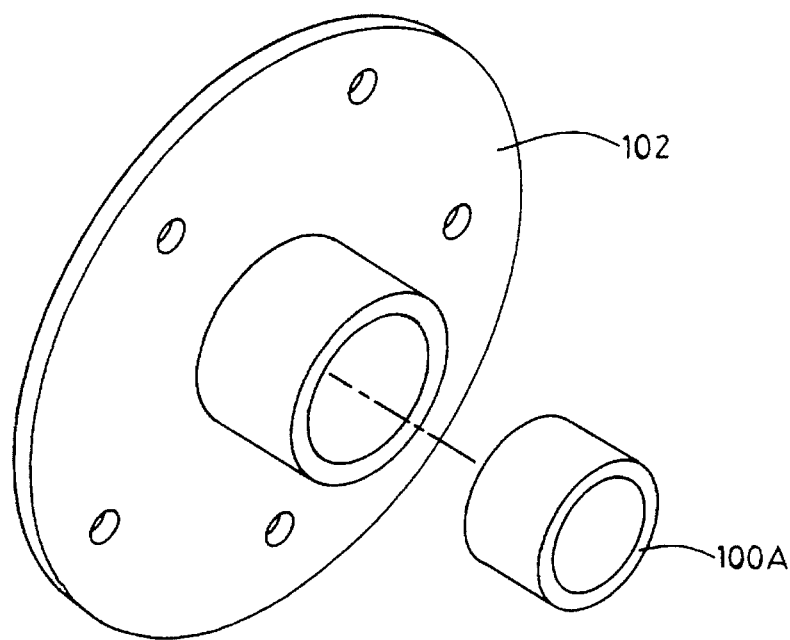
FIG. 1 is a perspective view of a housing of the present invention showing the insertion of the tungsten carbide bushing therein.
Figure 2:
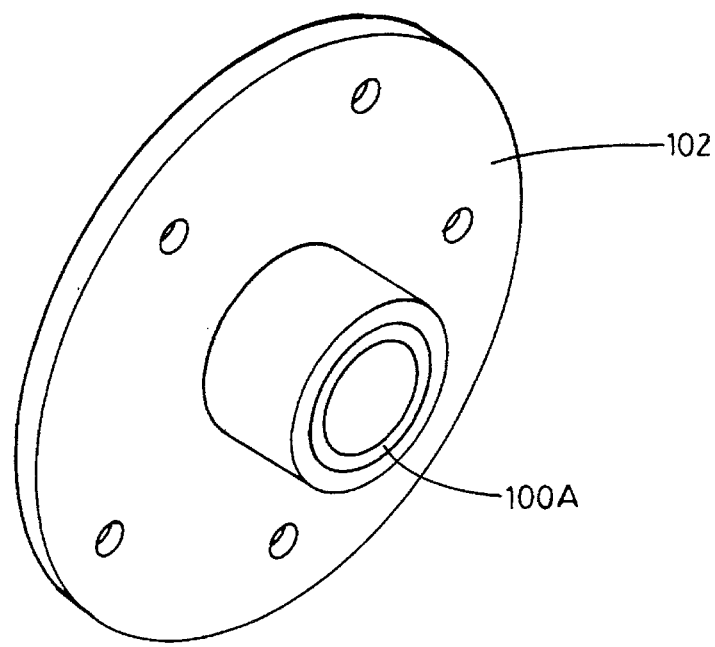
FIG. 2 is a perspective view of the anchor housing of FIG. 1 showing the tungsten carbide bushing in place therein.
Figure 3:
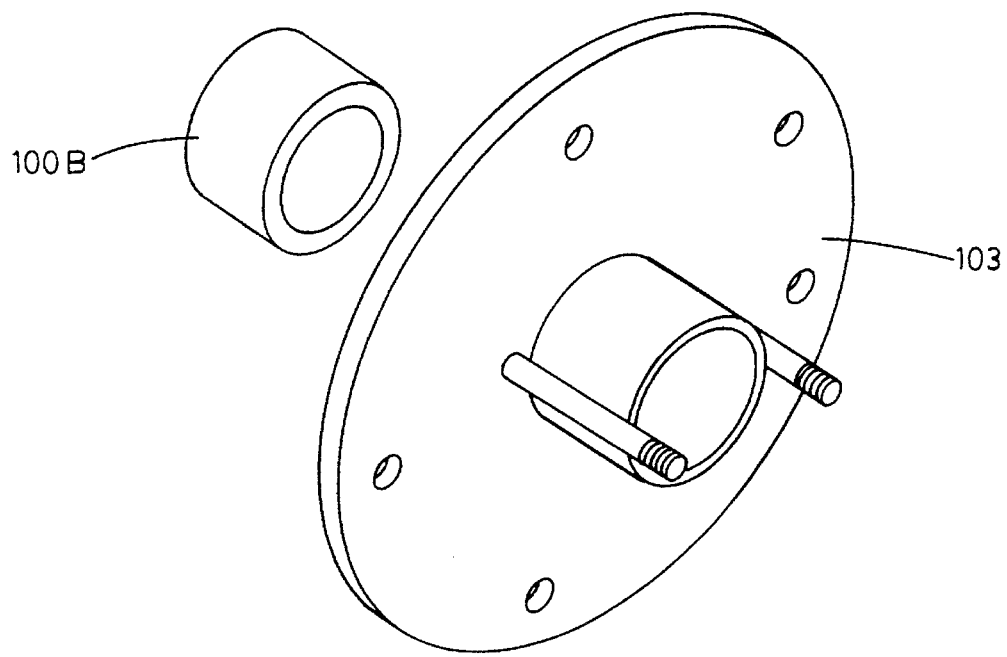
FIG. 3 is a perspective view of the packing gland housing of the present invention showing the insertion of a second tungsten carbide bushing therein.
Figure 4:
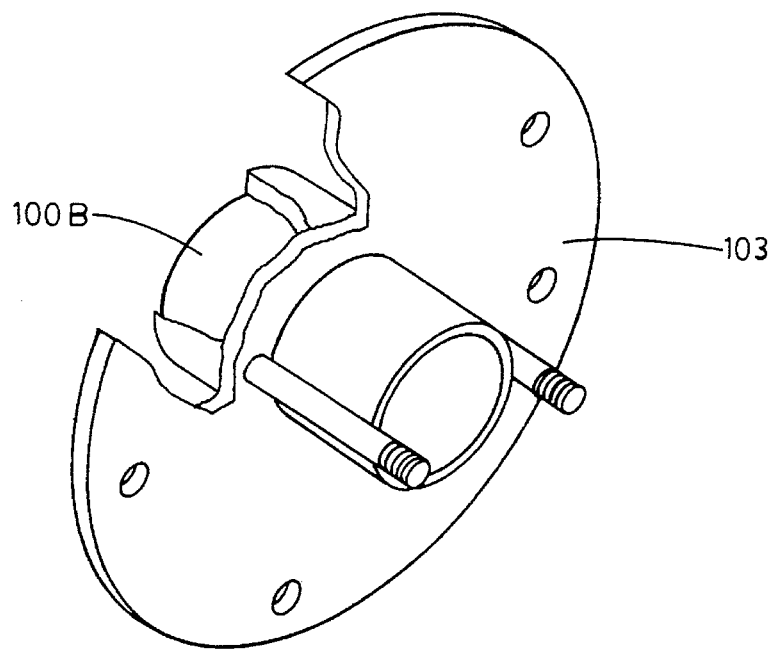
FIG. 4 is a partially cut away perspective view of the housing of FIG. 3 showing the tungsten carbide bushing in place therein.
Figure 7:
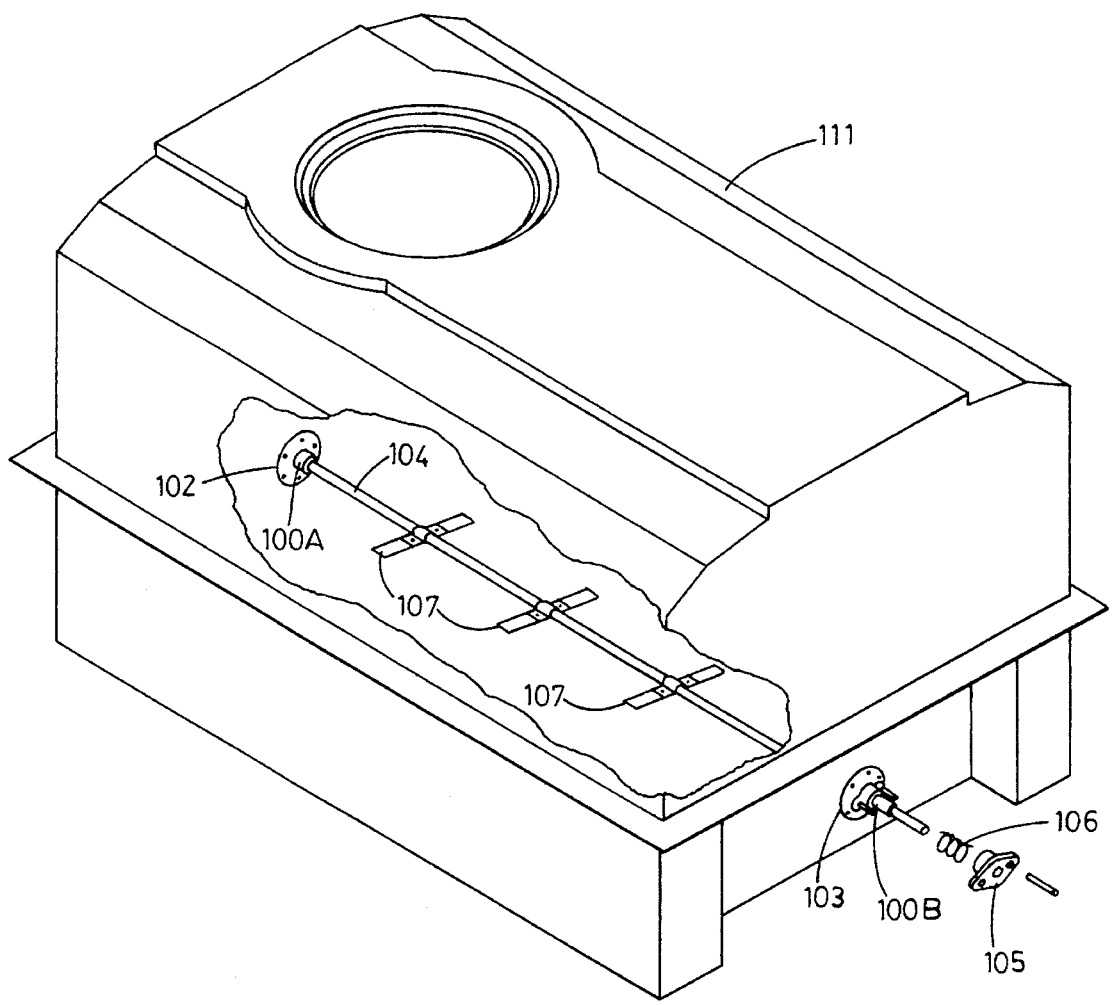
FIG. 7 is a partially cut away perspective view of an agitation tank assembly showing the shaft with agitation paddles attached thereto, and bearings in place at either end of the shaft which have been inserted into the corresponding bushings within the housings in the walls of the tank at opposite ends of the shaft.

Referring to the drawings wherein like reference characters designate like or corresponding parts throughout the several views, and referring particularly to FIGS. 1 and 2, it is seen that the invention includes an anchor housing 102 into which tungsten carbide bushing 100A is inserted. Housing 102 is mounted in a wall of tank 111 as shown in FIG. 7. Similarly, FIGS. 3 and 4 show the opposite end packing gland housing 103 into which tungsten carbide bushing 100B is inserted. Housing 103 is attached to the opposite wall of tank 111 as shown in FIG. 7. Bushings 100A and 100B are roughly the same size and designed to receive bearings 101A and 101B, respectively.

The central shaft 104 of the present invention has two areas 108 and 109 at each end, each such area having a smaller diameter than the main shaft 104 as shown in FIG. 5. Bearing 101A fits over area 108, and bearing 101B fits over area 109 as shown in FIG. 6. Area 108 with attached bearing 101A is designed so that bearing 101A slides into bushing 100A of housing 102. Similarly, area 109 with attached bearing 101B is designed so that bearing 101B slides into bushing 100B of housing 103. Area 109 is longer than area 108 because corresponding housing 103 is deeper than housing 102.

Agitation paddles 107 are provided along shaft 104 to mix the slurry in the tank as shaft 104 is rotated, as shown in FIG. 7. Packing 106 and a packing follower 105 are mounted on packing gland 103 to hold it in place. Rotation is then imparted to the extension 109 of shaft 104 by appropriate mechanical means.

DESCRIPTION OF THE PREFERRED EMBODIMENTS

In the preferred embodiment, the shaft of the present invention is made of stainless steel, and the bearings and bushings are made of tungsten carbide. The bearings attached to the shaft are of a smaller diameter than the bushings attached to the two housings which receive the shaft. The bearings fit inside the bushings at either end of the shaft so that the bearings are free to rotate inside the bushings. In this way, the tungsten carbide surfaces of the bushings and bearings are in contact with each other, thereby reducing and/or eliminating damage from wear.

A brazing strip (not shown) is placed between the bushings 100A, 100B and the respective housings 102 and 103 to assure a tight fit of the bushings to the housings. This tight fit is accomplished by heating the bushings 100A, 100B until they are bright red in color. Such heat causes the brazing strip to solidify. Upon cooling of the tungsten carbide bushing, the brazing material bonds the bushing to the housing. A similar procedure is used to bond bearings 101A, 101B to shaft 104.

The tank of FIG. 7 can be of any shape or size, but typical sizes range from 100 gallons to 600 gallons in capacity. The agitation shaft can run horizontally as shown in FIG. 7, or vertically inside the tank, with power provided at the top.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. An abrasion resistant agitator bearing system for use in a mineral dissolution machine comprising:

a. an elongated shaft disposed inside an agitation tank, said shaft having two ends with a plurality of agitation paddles attached thereto intermediate the ends;

b. a first annular tungsten carbide bearing affixed to one end of said shaft;

c. a second annular tungsten carbide bearing affixed to the opposite end of said shaft;

d. an anchor housing in the wall of said tank having a first tungsten carbide bushing mounted therein for receiving said first bearing whereby said bearing is free to rotate inside said bushing; and e. a second housing in an opposite wall of said tank having a second tungsten carbide bushing mounted therein for receiving said second bearing whereby said second bearing is free to rotate inside said second bushing.

2. The system described in claim 1 wherein each of said bushings is adhered inside its respective housing by use of a brazing strip placed between bushing and housing which strip is then heated to form a bond between bushing and housing.

3. The system described in claim 2 wherein each of said bearings is adhered to the shaft by use of a brazing strip placed between bearing and shaft which strip is then heated to form a bond between bearing and shaft.

4. The system described in claim 3 wherein said shaft includes areas of smaller diameter on either end for receiving said bearings.

5. The system described in claim 4 wherein the area of smaller diameter on the shaft which corresponds to said second housing is elongated in order to extend through said housing for attachment to a means for imparting motion.

\* \* \* \* \*